United States Patent [19]

Yasunaga et al.

[11] Patent Number: 5,180,755
[45] Date of Patent: Jan. 19, 1993

[54] METHOD FOR PRODUCING ANTISTATIC POLYURETHANE RESIN

[75] Inventors: Kuniaki Yasunaga; Shigeru Ueno, both of Yokohama, Japan

[73] Assignee: Bridgestone Corporation, Tokyo, Japan

[21] Appl. No.: 721,405

[22] Filed: Jun. 26, 1991

[30] Foreign Application Priority Data

Jun. 29, 1990 [JP] Japan .................. 2-171993

[51] Int. Cl.$^5$ ................. C08K 3/16
[52] U.S. Cl. ................... 521/116; 521/117; 524/758; 524/769
[58] Field of Search ............. 521/116, 117; 524/758, 524/769

[56] References Cited

U.S. PATENT DOCUMENTS

| | | | |
|---|---|---|---|
| 4,336,148 | 6/1982 | Wirth et al. | 524/385 |
| 4,654,279 | 3/1987 | Bauer et al. | 429/192 |
| 4,855,077 | 8/1989 | Shikinami et al. | 252/518 |
| 4,861,805 | 8/1989 | Saavedra et al. | 521/119 |
| 4,914,150 | 4/1990 | Prier | 524/779 |

OTHER PUBLICATIONS

S. Kohjiya, et al., "Ionic conductivity and morphology of complexes formed by polyurethanes and lithium perchlorate", Polymer Bulletin, Mar. 1990, pp. 299-306.

*Primary Examiner*—Maurice J. Welsh
*Assistant Examiner*—Rachel Johnson
*Attorney, Agent, or Firm*—Cushman, Darby & Cushman

[57] ABSTRACT

A method for producing antistatic polyurethane resins according to the present invention comprises a reaction of a compound having at least two active hydrogen atoms with an organic isocyanate in the presence of at least one kind of complex compounds represented by a general formula $[Me(ClO_4)_n]_x[R(OH)_y]_z$ and being liquid at room temperature, wherein Me is an element belonging to Group I or II in the periodic table; n is a number of 1-2; x is a number of 1-5; y is a number of 1-3; z is a number of 1-6; and R is a residual group other than hydroxyl group in a polyhydric alcohol or its derivative. Me of said complex compounds is preferably Li, Na, K, Ca or Ba.

As antistatic agents are liquid at room temperature in the present invention, they can be formulated uniformly within raw materials of polyurethane resins. By virtue thereof, the antistatic effect is exhibited homogeneously and so highly.

5 Claims, 1 Drawing Sheet

METHOD FOR PRODUCING ANTISTATIC POLYURETHANE RESIN

FIELD OF THE INVENTION

The present invention relates to a method for producing polyurethane resins superior in the antistatic property.

DESCRIPTION OF THE PRIOR ART

Polyurethane resins are used these days in numerous goods due to their ease of formation. Products of so-called polyurethane foams are employed widely for various cushioning materials including the interiors of automobiles.

However, since polyurethane resins tend to be statically charged, the development of antistatic agents has been pursued.

When polyurethane resins have been charged statically, the resin surface becomes noticeably dirty with trash or dust attached thereto. During fabrication of the foams, there are possibilities that sparks may be emitted from the static electricity charged resin and that a fire may break out for that reason.

Further, the generation of static electricity, can cause damage to inner circuits during the manufacture, assembly or transportation of integrated circuit chips. Further, in the course of slicing polyurethane forms, the foam sheets tend to stick together to lower the slicing efficiency.

To solve these problems, antistatic technology is now being developed, however, the results obtained so far have not been satisfactory.

There is a method of incorporating cationic, nonionic or other surfactants into the resin, however, the antistatic effect requires a large amount of material to be incorporated. This brings about not only an economic disadvantage but also the problem that the material is readily removed from the product resin by washing, etc., which makes the method not recommendable. Surfactants employed for the purpose of antistatic agents also may undesirably become hindrances to foaming in the course of producing polyurethane foams.

A second method employs an incorporation of electroconductive fillers, however, the amount of material added to the resin must be large. When the amount is incorporated in polyurethane raw materials, the viscosity of raw materials increases, which is unfavorable for the production of polyurethane resin.

A third method is a treatment of formed resins, which includes treating the resin surface with the above-mentioned surfactants, etc. This method is disadvantageous, as the effect does not endure for a long period of time, and high treatment cost results in an economic inferiority.

Japanese Patent Provisional Publication No. 43951/1988 discloses a method relating to the present invention. The reference teaches that the antistatic property for polyurethane resins can be provided by incorporating an alkali metal salt or an alkali earth metal salt of perchloric acid or thiocyanic acid into the resin.

However, the antistatic effect of these additives is not large and because of all of these additives are in powder or crystal forms, it is difficult to disperse them uniformly in the raw material for polyurethane resins. This results in problems like sedimentation which causes unevenness of the antistatic effect in the resin so formed. Accordingly, the expected antistatic effect cannot be obtained.

Further, since a mixture of these additives with organic materials has a danger of explosion upon being shocked, they are hardly employable practically.

SUMMARY OF THE INVENTION

It is an object of the present invention to solve the problems mentioned above, which has been attained by the successful development of an antistatic agent which exhibits a superior antistatic effect and excellent in dispersion in resins.

DETAILED DESCRIPTION OF THE PREFERRED EMBODIMENTS

Figure 1:
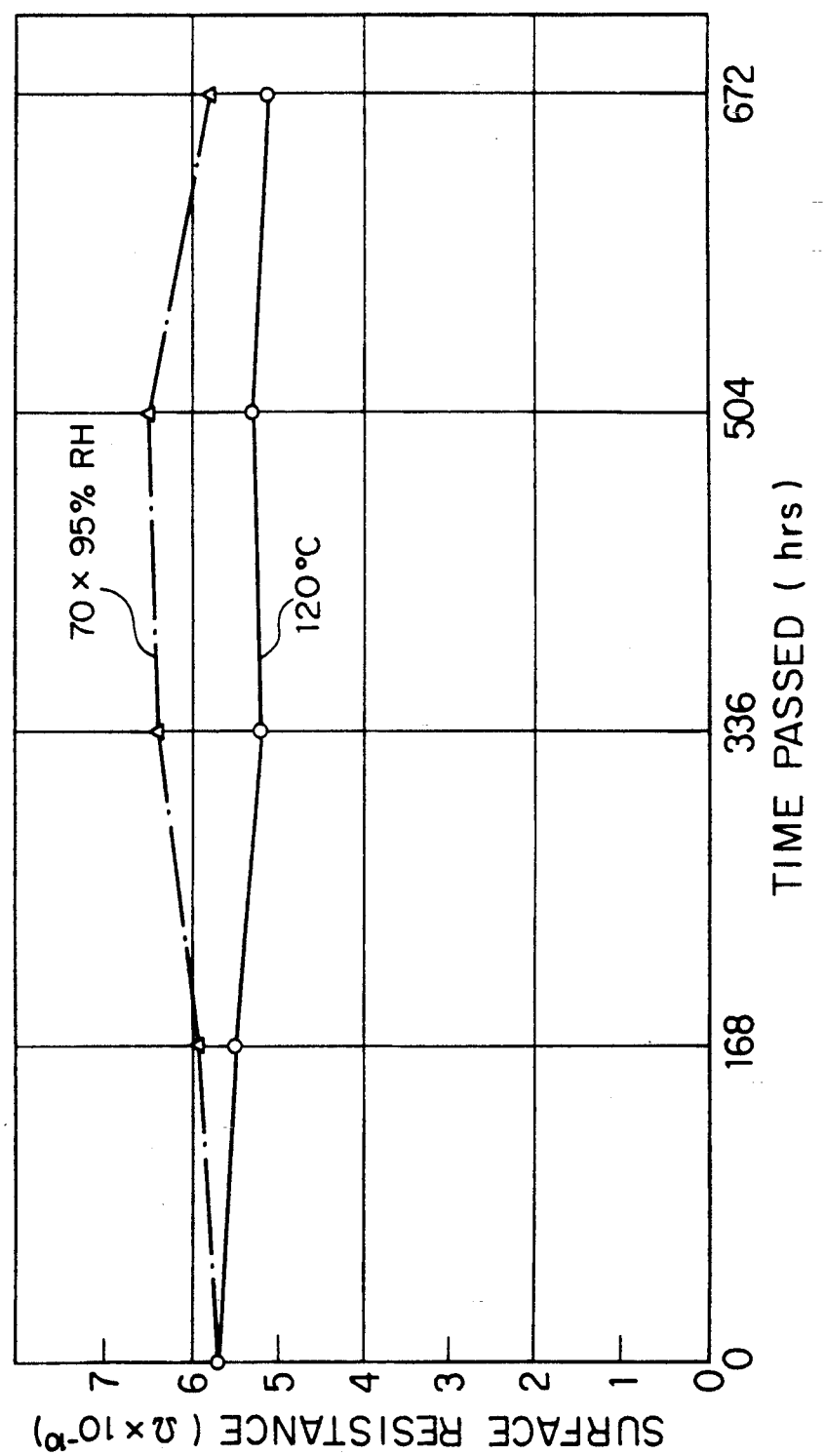
FIG. 1 indicates degree of changes in the surface resistance during the passage of time for Example 3 of the present invention.

In order to attain the object, the present invention has adopted a method as mentioned hereunder, that is; a method for producing antistatic polyurethane resins which comprises a reaction of a compound having at least two active hydrogen atoms with an organic isocyanate in the presence of at least one kind of complex compound represented by a general formula $[Me(ClO_4)_n]_x[R(OH)_y]_z$ which is liquid at room temperature, wherein Me is an element belonging to Group I or II in the periodic table; n is a number of 1–2; x is a number of 1–5; y is a number of 1–3; z is a number of 1–6; and R is a residual group other than hydroxyl group in a polyhydric alcohol or its derivative.

Me of said complex compounds is preferably Li, Na, K, Ca or Ba.

In the present invention, the complex compound employed is represented by the formula mentioned above, and $Me(ClO_4)_n$ constituting the complex compound is exemplified by sodium perchlorate, barium perchlorate or calcium perchlorate.

As to $R(OH)_y$, R denotes a residual group other than hydroxyl group in a polyhydric alcohol or its derivative (hereinafter referred to as "glycols"), and the glycols include ethyleneglycol, ethyleneglycol monomethylether, ethyleneglycol monoethylether, ethyleneglycol monoisopropylether, ethyleneglycol monobutylether, ethyleneglycol monoisoamylether, ethyleneglycol monophenylether, ethyleneglycol monobenzylether, ethyleneglycol monohexylether, diethyleneglycol, diethyleneglycol monomethylether, diethyleneglycol monoethylether, diethyleneglycol monobutylether, diethyleneglycol acetate, triethyleneglycol, triethyleneglycol monomethylether, triethyleneglycol monoethylether, triethyleneglycol monobutylether, tetraethyleneglycol, polyethyleneglycol, propyleneglycol, propyleneglycol monomethylether, propyleneglycol monoethylether, propyleneglycol monobutylether, dipropyleneglycol, dipropyleneglycol monomethylether, dipropyleneglycol monoethylether, tripropyleneglycol, tripropyleneglycol monomethylether, polypropyleneglycols, trimethyleneglycol, 1,4-butanediol, 1,5-pentandiol, hexyleneglycol, octyleneglycol, glycerin, glycerin mono- or di-acetate and glycerin monobutylate.

The weight ratio of Na, Ba or Ca salt of perchlorate to the glycols for the dissolution and reaction to constitute the complex compound is 10:90–70:30 by weight, and is preferably 20:80–55:45 by weight. The complex compound having the specified ratio is characterized by a colorless or yellowish brown transparent or semi-transparent liquid at room temperature.

The amount of the complex compound to be added to polyurethane resins is 0.05-10 wt. %, and is preferably 0.1-5 wt. % per resin.

An amount less than 0.05 wt. % brings about too small an antistatic effect, and more than 10 wt. % is unacceptable due to an lowered fabrication efficiency during mixing, decreased strength for products, reduced foam stability and tendency of shrinkage after foaming.

As described previously, the complex compound can be incorporated easily in polyurethane raw materials and dispersed uniformly without any sedimentation due to the liquid state.

Especially, as the complex compound is composed of a polyhydric alcohol, it is quite characteristically compatible with raw materials for polyurethane resins and provides the formed resin with homogenous antistatic effect.

Based on the present invention, a high antistatic level satisfying MIL-B.81705B Standards is attained with a far lower amount of the agent compared with conventional methods. Furthermore, the lower amount of incorporated material is enough for prevention of static electricity generation during the fabrication or handling of the resin.

In addition to the above, the agent does not affect the physical properties of the polyurethane resins and not only furnishes prolonged antistatic effects but also is able to turn low density polyurethane forms ($\rho$: <20 Kg/m$^3$) into antistatic resins.

As perchlorate is used in a form of complex compound, handling and operation of the agent is easy with no fear of explosion by shock.

For the polyurethane resins, not only hard resins and elastic resins, but also soft or rigid foamed resins are entirely suitable for the invention. They may be conventional resins and their production requires no other methods than conventional ones, which makes the present invention versatile.

As for the compound having at least two active hydrogen atoms to be used as a raw material of polyurethane resins, polyetherpolyols like ethyleneoxide additives or propyleneoxide additives of propyleneglycol, glycerin, trimethylolpropane or sorbitol; polyesterpolyols obtainable from adipic acid, succinic acid, maleic acid, phthalic acid, etc. and ethyleneglycol, propyleneglycol, butyleneglycol, etc; and polybutadienepolyols are mentioned, for example, and the average molecular weight is around 300–6000. Such low-molecular weight glycols like ethyleneglycol, propyreneglycol, butyleneglycol and diethyleneglycol are included therein.

As for the organic isocyanate, tolylenediisocyanate, diphenylmethanediisocyanate and/or prepolymers thereof having terminal isocyanate groups are mentioned.

For the catalyst, organotin compounds like stanousoctoate and dibutyltindilaurate; and amines like triethylenediamine, triethylamine, N-ethylmorpholine, dimethylethanolamine, pentamethyldiethylenetriamine and parmityldimethylamine; can be used.

As a foaming agent in polyurethane foam production, water is used generally, however, such low-boiling organic solvents as monofluorotrichloromethane and methylenechloride may be used as auxiliary ones other than water.

For the foam-stabilizing agent, silicone surfactants like polydialkylsiloxanes and polysiloxane-polyalkyleneoxide blockcopolymers are used.

The present invention will be described in detail hereunder based on examples.

EXAMPLES 1-4 AND COMPARATIVE EXAMPLE 1

As the polyol for preparation of polyurethane resins, a polyetherpolyol (OH Value 44) of propyleneoxide-ethyleneoxide adduct of glycerin was used; and as the antistatic agent, a complex of $NaClO_4$ and $CH_3OCH_2CH_2OCH_2CH_2OH$ (ratio=$\frac{1}{2}$) in varied amounts was used, and polyurethane resins were prepared under the formulation mentioned in Table 1.

In Table 1, the measured density and antistatic property of foams obtained are shown.

The antistatic property was evaluated in accordance with MILB81705B (Decay-time measuring method) using a STATIC DECAY METER MODEL 406C (ELECTRO-TECH SYSTEMS, Inc.), in which to a sample cut in 76×127×10 mm was applied 5000 volt electric potential difference and the (static) decay time (seconds) when earthed till the potential decay to 0 volt was measured. The (static) decay time of within 2 seconds is regarded as the pass standard.

The standard is applied to package materials for packaging such articles as IC parts having characteristics readily affected by influences of static electricity, and package materials having the (static) decay time of shorter than 2 seconds are recognized as capable of preventing the decrease in characteristics by static electricity.

TABLE 1

|  | Example 1 | Example 2 | Example 3 | Example 4 | Comp. Example 1 |
|---|---|---|---|---|---|
| (raw material) | | | | | |
| Polyetherpolyol | 100 | 100 | 100 | 100 | 100 |
| TDI-80 | 48.3 | 48.3 | 48.3 | 48.3 | 48.3 |
| Water | 3.9 | 3.9 | 3.9 | 3.9 | 3.9 |
| DABCO 33LV | 0.30 | 0.30 | 0.30 | 0.30 | 0.30 |
| L-6202 | 1.20 | 1.20 | 1.20 | 1.20 | 1.20 |
| Stanousoctoate | 0.27 | 0.27 | 0.27 | 0.27 | 0.27 |
| Antistatic agent *1 | 0.5 | 1.0 | 2.0 | 3.0 | 0 |
| (Physical property) | | | | | |
| Density (kgf/m$^3$) | 25.2 | 25.5 | 25.2 | 24.9 | 25.0 |
| MIL81705B (Static) Decay time (sec) | 0.63 | 0.31 | 0.17 | 0.11 | ∞ |
| Evaluation | pass | pass | pass | pass | fail |
| Volume resistance ($\Omega$/cm × 10$^{-10}$) | 11.7 | 6.6 | 4.1 | 2.9 | 79600 |
| Surface resistance ($\Omega$ × 10$^{-10}$) | 19.6 | 9.8 | 5.8 | 4.6 | 54300 |

*1: Complex of $NaClO_4$ and $CH_3OCH_2CH_2OCH_2CH_2OH$

The volume resistance and surface resistance were also measured using a TR8652 digital electrometer (ADVANTEST Co.), in which 20 volt electric potential difference was applied to a sample and the resistance was defined by a value obtained by dividing the output voltage with the current flow at one minute after the beginning of electric potential difference application. A smaller resistance is indicated by a smaller value, which means more conductive or difficult in charging static electricity.

In FIG. 1 are shown changes in the surface resistivity during storages at 120° C. and at 70° C.×95% relative humidity for the foam of Example 3.

As understandable from FIG. 1, the antistatic property under storage under high temperature and humidity exhibits no change, which indicates stable antistatic properties are available for a long period of time under conditions of ordinary circumstance.

From the above result, it is clear that excellent antistatic properties are obtainable by the use of antistatic agents of the present invention and that the properties do not change in the course of time.

EXAMPLES 5-7 AND COMPARATIVE EXAMPLE 2

A polyetherpolyol (OH Value 56) obtained by addition of propyleneoxide to glycerin and varied amounts of the same complex compound as employed in Example 1 were formulated as shown in Table 2, and polyurethane foams were prepared by the same method.

Results of measurement for density and antistatic property of the foams obtained are mentioned in Table 2.

It is clear from the Examples that excellent antistatic properties are attained by the present invention.

TABLE 2

|  | Example 5 | Example 6 | Example 7 | Comp. Example 2 |
|---|---|---|---|---|
| (raw material) | | | | |
| Polyetherpolyol | 100 | 100 | 100 | 100 |
| TDI-80 | 50.3 | 50.3 | 50.3 | 50.3 |
| Water | 3.9 | 3.9 | 3.9 | 3.9 |
| DABCO 33LV | 0.30 | 0.30 | 0.30 | 0.30 |
| L-6202 | 1.20 | 1.20 | 1.20 | 1.20 |
| Stanousoctoate | 0.30 | 0.30 | 0.30 | 0.30 |
| Antistatic agent *1 | 0.5 | 1.0 | 2.0 | 0 |
| (Physical property) | | | | |
| Density (kgf/m$^3$) | 25.3 | 25.1 | 25.3 | 25.7 |
| MIL81705B (Static) Decay time (sec) | 1.92 | 1.36 | 0.65 | ∞ |
| Evaluation | pass | pass | pass | fail |
| Volume resistance ($\Omega$/cm × 10$^{-10}$) | 35.7 | 14.7 | 5.6 | 96700 |
| Surface resistance ($\Omega$ × 10$^{-10}$) | 58.8 | 26.3 | 10.1 | 69800 |

*1: Complex of NaClO$_4$ and CH$_3$OCH$_2$CH$_2$OCH$_2$CH$_2$OH

EXAMPLES 8-10 AND COMPARATIVE EXAMPLE 3

A polyesterpolyol (OH Value 50) obtained by polymerization-condensation of adipic acid, diethyleneglycol and trimethylolpropane, and the antistatic agent varied similarly to Examples 1-7 in the amount were formulated as shown in Table 3, and polyurethane foams were prepared. In the Table, L-536 is a silicone surfactant (Nippon Unicar Co.).

Results of measurement for density and antistatic property of the foams obtained are mentioned in Table 3.

It is clear from the Examples that excellent antistatic properties are attained by the present invention.

TABLE 3

|  | Example 8 | Example 9 | Example 10 | Comp. Example 3 |
|---|---|---|---|---|
| (raw material) | | | | |
| Polyesterpolyol | 100 | 100 | 100 | 100 |
| TDI-80 | 47.2 | 47.2 | 47.2 | 47.2 |
| Water | 3.8 | 3.8 | 3.8 | 3.8 |
| N-ethylmorpholine | 2.1 | 2.1 | 2.1 | 2.1 |
| L-536 | 1.8 | 1.8 | 1.8 | 1.8 |
| Stanousoctoate | 0.02 | 0.02 | 0.02 | 0.02 |
| Antistatic agent *1 | 0.5 | 1.0 | 2.0 | 0 |
| (Physical property) | | | | |
| Density (kgf/m$^3$) | 28.0 | 27.8 | 27.8 | 28.6 |
| MIL81705B (Static) Decay time (sec) | 0.63 | 0.29 | 0.18 | 69.3 |
| Evaluation | pass | pass | pass | fail |
| Volume resistance ($\Omega$/cm × 10$^{-10}$) | 11.2 | 3.7 | 2.1 | 475 |
| Surface resistance ($\Omega$ × 10$^{-10}$) | 15.7 | 6.1 | 3.1 | 806 |

*1: Complex of NaClO$_4$ and CH$_3$OCH$_2$CH$_2$OCH$_2$CH$_2$OH

MIRACTON P22s (polyurethane resin obtained by reacting diphenylmethanediisocyanate with a polyesterpolyol obtained from adipic acid and 1,4-butanediol: Nippon Miracton Co.) was dissolved in dioxane and SILICA SS-40 (hydrophobic silica: Nippon Silica Co.) was dispersed therein with a ball mill.

1 wt. % of the antistatic agent same as employed in Example 1 was added under dissolution with a mixer, and a cast film was prepared.

Similarly, a film containing no antistatic agent was prepared as Comparative Example 4.

Results of measurement for antistatic property of the films obtained are mentioned in Table 4.

It is clear from the Example 11 that excellent antistatic effects are attained also for films.

TABLE 4

|  | Example 11 | Comp. Example 4 |
|---|---|---|
| Antistatic agent *1 | 1.0 | 0 |
| Physical property | | |
| MIL81705B (Static) Decay time (sec) | 0.03 | 2.25 |
| Evaluation | pass | fail |
| Volume resistance ($\Omega$/cm × 10$^{-10}$) | 0.8 | 28.5 |
| Surface resistance ($\Omega$ × 10$^{-10}$) | 1.4 | 61.0 |

TABLE 5

|  | Example 12 | Example 13 | Example 14 | Example 15 | Example 16 |
|---|---|---|---|---|---|
| (raw material) | | | | | |
| Polyetherpolyol | 100 | 100 | 100 | 100 | 100 |
| TDI-80 | 48.3 | 48.3 | 48.3 | 48.3 | 48.3 |
| Water | 3.9 | 3.9 | 3.9 | 3.9 | 3.9 |
| DABCO 33LV | 0.30 | 0.30 | 0.30 | 0.30 | 0.30 |
| L-6202 | 1.20 | 1.20 | 1.20 | 1.20 | 1.20 |
| Stanousoctoate | 0.27 | 0.27 | 0.27 | 0.27 | 0.27 |
| Antistatic agent A *1 | 1.0 | | | | |
| Antistatic agent B *1 | | 1.0 | | | |
| Antistatic agent C *1 | | | 1.0 | | |
| Antistatic agent D *1 | | | | 1.0 | |
| Antistatic agent E *1 | | | | | 1.0 |
| (Physical property) | | | | | |
| Density (kgf/m$^3$) | 25.0 | 24.8 | 25.3 | 24.9 | 24.9 |
| MIL81705B (Static) Decay time (sec) | 0.31 | 0.55 | 0.28 | 0.65 | 0.31 |
| Evaluation | pass | pass | pass | pass | pass |
| Volume resistance ($\Omega$/cm × 10$^{-10}$) | 4.2 | 6.0 | 3.0 | 5.6 | 4.7 |
| Surface resistance | 5.3 | 8.9 | 4.9 | 8.9 | 6.5 |

TABLE 5-continued

| | Example 12 | Example 13 | Example 14 | Example 15 | Example 16 |
|---|---|---|---|---|---|
| ($\Omega \times 10^{-10}$) | | | | | |

*1: Complex of $LiClO_4$ and $CH_3OCH_2CH_2OCH_2CH_2OH$
*2: Complex of $Mg(ClO_4)_2$ and $CH_3OCH_2CH_2OCH_2CH_2OH$
*3: Complex of $Ba(ClO_4)_2$ and $CH_3OCH_2CH_2OCH_2CH_2OH$
*4: Complex of $Ca(ClO_4)_2$ and $CH_3OCH_2CH_2OCH_2CH_2OH$
*5: Complex of $NaClO_4$ and $CH_3OCH_2CH_2OCH_2CH_2OCH_2CH_2OH$

EXAMPLES 12–16

Polyols employed in Examples 1–4 and five kinds of complex compounds for the antistatic agent of the present invention were formulated as mentioned in Table 5, and polyurethane foams were prepared with the use of a foaming machine.

Results of measurement for density and antistatic property of the foams obtained are mentioned in Table 5.

It is clear that excellent results are attained by antistatic agents of the present invention.

EXAMPLE 17 AND COMPARATIVE EXAMPLE 5

Using polyetherpolyols employed in Examples 5–7, a comparison between the addition of the $NaClO_4$—$CH_3OCH_2CH_2OCH_2CH_2OH$ complex and the direct addition of $NaClO_4$ (Japanese Patent Provisional Publication No. 43951/1988) was conducted. For the preparation of polyurethane foams, the complex compound was injected as a component stream, and the $NaClO_4$ powder was dispersed into the polyetherpolyol and injected. Since the complex compound of the present invention contained 34 wt. % of $NaClO_4$, amount of the $NaClO_4$ powder added was 0.34 wt. %.

The formulation and results of measurement for density and antistatic property of the foams obtained are mentioned in Table 6.

The measurement for density and antistatic property were conducted at the upper, middle and lower points of the foam obtained to check the deviation. In that case, a foam of 700 mm in height was formed in a paper box of 600 mm × 600 mm in base and the measurement was conducted for points 100 mm below the top as the upper, center as the middle and 100 mm above the bottom as the lower.

It is clear from the result of Table 6 that reduced deviation of antistatic property within the foam and improvement therein are attained by the use of complex compounds of the present invention.

TABLE 6

| (raw material) | Example 17 | Comp. Example 5 |
|---|---|---|
| Polyetherpolyol | 100 | 100 |
| TDI-80 | 58.3 | 58.3 |
| Water | 4.4 | 4.4 |
| DABCO 33LV | 0.36 | 0.36 |
| L-6202 | 1.20 | 1.20 |
| Stanousoctoate | 0.33 | 0.33 |
| Dichloromethane | 3.0 | 3.0 |
| Antistatic agent A *1 | 1.0 | |
| Antistatic agent F *6 (Physical property) | | 1.0 |

TABLE 6-continued

| | Example 17 | | | Comp. Example 5 | | |
|---|---|---|---|---|---|---|
| | upper Block | middle Block | lower Block | upper Block | middle Block | lower Block |
| Density (kgf/m³) | 19.2 | 19.3 | 19.7 | 19.1 | 19.7 | 19.9 |
| MIL81705B (Static) Decay time (sec) | 1.58 | 1.42 | 1.56 | 4.20 | 5.89 | 4.54 |
| Evaluation | pass | pass | pass | fail | fail | fail |
| Volume resistance ($\Omega$/cm × $10^{-10}$) | 30.7 | 19.6 | 27.8 | 73.0 | 112 | 79.0 |
| Surface resistance ($\Omega$/cm × $10^{-10}$) | 49.4 | 28.5 | 48.5 | 105 | 170 | 117 |

*1: Complex of $NaClO_4$ and $CH_3OCH_2CH_2OCH_2CH_2OH$
*6: $NaClO_4$ powder

We claim:

1. A method for producing antistatic flexible polyurethane resins which comprises reacting:
   a compound having at least two active hydrogen atoms; and
   an organic isocyanate;
   wherein said reaction takes place in the presence of at least one complex compound of formula $$[Me(ClO_4)_n]_x[R(OH)_y]_z$$

wherein said complex compound is a liquid at room temperature, and wherein Me is selected from the group consisting of group I and group II elements in the periodic table, n is a number of 1 to 2, x is a number of 1 to 5, y is a number of 1 to 3, z is a number of 1 to 6, and R is a residual group other than hydroxyl group in a polyhydric alcohol or its derivative.

2. A method for producing antistatic polyurethane resins according to claim 1, in which Me of said complex compounds is Li, Na, K, Ca or Ba.

3. A method for producing antistatic polyurethane resins according to claim 1 or 2, wherein the polyurethane resins are soft or rigid polyurethane foams.

4. A method for producing antistatic polyurethane resins according to claim 1 or 2, wherein the polyurethane resins are polyurethane films.

5. A method as claimed in claim 1, wherein the polyhydric alcohol $R(OH)_y$ is selected from the group consisting of ethyleneglycol, ethyleneglycol monomethylether, ethyleneglycol monoethylether, ethyleneglycol monoisopropylether, ethyleneglycol monobutylether, ethyleneglycol monoisoamylether, ethyleneglycol monophenylether, ethyleneglycol monobenzylether, ethyleneglycol monohexylether, diethyleneglycol, diethyleneglycol monomethylether, diethyleneglycol monoethylether, diethyleneglycol monobutylether, diethyleneglycol acetate, triethyleneglycol, triethyleneglycol monomethylether, triethyleneglycol monoethylether, triethyleneglycol monobutylether, tetraethyleneglycol, polyethyleneglycol, propyleneglycol, propyleneglycol monomethylether, propyleneglycol monoethylether, propyleneglycol monobutylether, dipropyleneglycol, dipropyleneglycol monomethylether, dipropyleneglycol monoethylether, tripropyleneglycol, tripropyleneglycol monomethylether, polypropyleneglycols, trimethyleneglycol, 1,4-butanediol, 1,5-pentandiol, hexyleneglycol, octyleneglycol, glycerin, glycerin mono-or di-acetate and glycerin monobutylate.

* * * * *